(12) United States Patent
Schnippering et al.

(10) Patent No.: US 11,407,769 B2
(45) Date of Patent: Aug. 9, 2022

(54) ORGANOLITHIUM PROCESS UNDER CONTINUOUS FLOW CONDITIONS

(71) Applicant: ALBEMARLE GERMANY GMBH, Frankfurt am Main (DE)

(72) Inventors: Stefan Schnippering, Siegburg (DE); Ulrich Wietelmann, Friedrichsdorf (DE); Nikzad Nikbin, Cambridge (GB); Gary John Tarver, Stevenage (GB)

(73) Assignee: Albemarle Germany GmbH, Frankfurt am Main (DE)

( * ) Notice: Subject to any disclaimer, the term of this patent is extended or adjusted under 35 U.S.C. 154(b) by 0 days.

(21) Appl. No.: 16/763,775

(22) PCT Filed: Nov. 13, 2018

(86) PCT No.: PCT/EP2018/081017
§ 371 (c)(1),
(2) Date: May 13, 2020

(87) PCT Pub. No.: WO2019/096762
PCT Pub. Date: May 23, 2019

(65) Prior Publication Data
US 2021/0040124 A1   Feb. 11, 2021

(30) Foreign Application Priority Data
Feb. 14, 2018 (DE) .................... 10 2017 010 643.6

(51) Int. Cl.
*C07F 1/02* (2006.01)
*B01J 19/00* (2006.01)

(52) U.S. Cl.
CPC ............ *C07F 1/02* (2013.01); *B01J 19/0093* (2013.01)

(58) Field of Classification Search
None
See application file for complete search history.

(56) References Cited

U.S. PATENT DOCUMENTS 3,438,420 A * 4/1969 Schwartz .................. C07F 1/02
159/49

FOREIGN PATENT DOCUMENTS

| EP | 1 956 023 A1 | 8/2008 | |
| JP | 2006241065 | * 9/2006 | ............ C07C 41/26 |
| WO | 2016/049509 A1 | 3/2016 | |

OTHER PUBLICATIONS

Schlosser, M et al. PATAI's Chemistry of Functional Groups, 2009, 1-59.*
JP-2006241065—machine translation from Google Patents, 2021.*

* cited by examiner

*Primary Examiner* — Clinton A Brooks
(74) *Attorney, Agent, or Firm* — R. Andrew Patty, II; McGlinchey Stafford, PLLC

(57) ABSTRACT

The invention relates to methods for CC bond formation using organolithium compounds under continuous flow conditions in a micro or mesoreactor system, wherein an organic substrate is reacted with an alkyl lithium compound in the presence of a donor solvent to form a Li intermediate, which can be reacted in situ or subsequently in a second reaction step with an electrophile to form an organic secondary product, the organolithium compound RLi being used as a solution in a hydrocarbon or hydrocarbon mixture and the RLi concentration being at least 3 M, preferably at least 4 M.

18 Claims, 3 Drawing Sheets

Fig.: 1

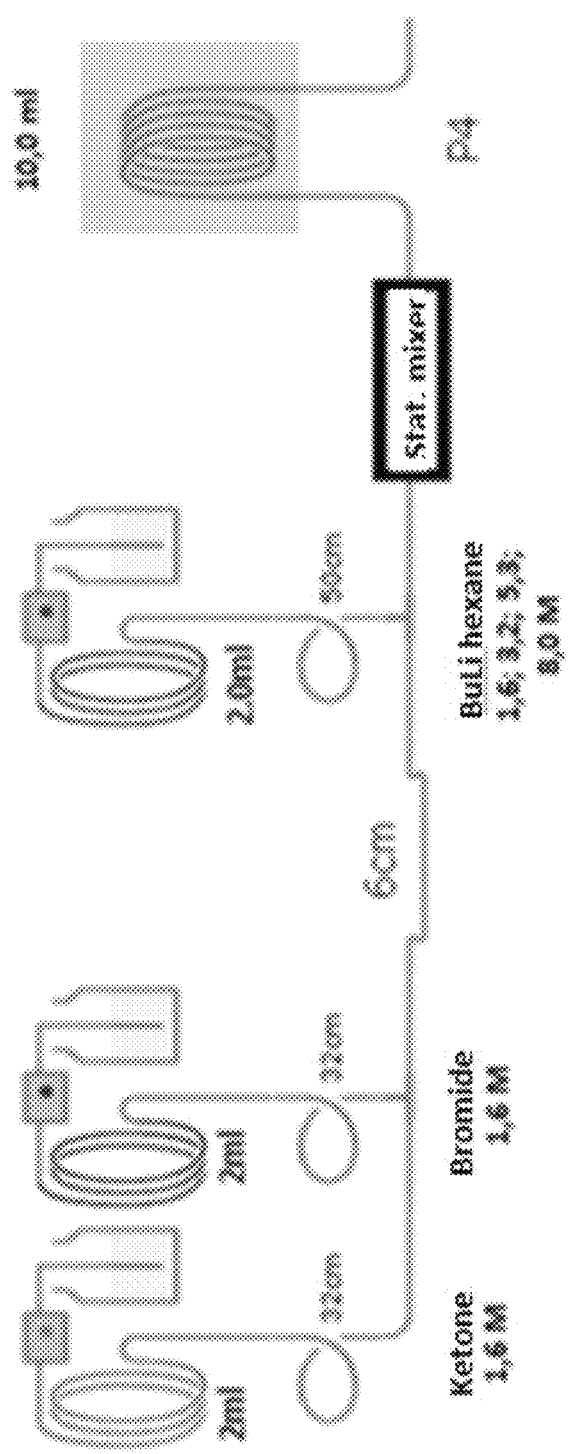
Fig.: 3

ORGANOLITHIUM PROCESS UNDER CONTINUOUS FLOW CONDITIONS

CROSS-REFERENCE TO RELATED APPLICATIONS

This application is the National Stage of International Patent Appl. No. PCT/EP2018/081017 filed on Nov. 13, 2018, which application claims priority from German Patent Application No. 10 2017 010 643.6, filed on Nov. 14, 2017. Each patent application identified above is incorporated here by reference in its entirety.

The invention relates to methods for CC bond formation using organolithium compounds under continuous flow conditions in a micro or mesoreactor system.

Organometallic species of the 1st main group, in particular organolithium compounds, are indispensable tools for organic synthesis since they serve as carbanion equivalents and can be used directly or indirectly for various CC linkage reactions. The most important reactions are additions to unsaturated functional groups, e. g. 1,2-additions to carbonyl compounds or CN double and triple bonds; deprotonation reactions as well as halogen/metal exchange reactions. Organolithium compounds are also used for transmetalations (e. g. production of organozinc or organocopper compounds) and used for transition metal-catalyzed CC coupling reactions. These reactions have been known for a long time and are summarized in corresponding textbooks (B. J. Wakefield, "Organolithium Methods", Academic Press London, 1988, etc.).

Due to their good solubility and stability, organolithium compounds RLi with R=alkyl group with 2-12 C atoms are preferably produced and used as solutions in hydrocarbons. Many such organolithium products, for example the butyllithium isomers n-butyllithium, sec-butyllithium and tert-butyllithium as well as hexyllithium and octyllithium, are available as solutions in hexane, heptane, cyclohexane, toluene and the like on an industrial scale. All these solutions have in common that they contain no donor solvent, such as an ether or an amine. Lithium alkyls are very readily soluble in such donor compounds, but these mixtures have only an unsatisfactory thermal stability. For example, butyllithium decomposes at 0° C. in THF with a half-life of 23.5 h. The decomposition takes place with the formation of ethylene and the enolate of acetaldehyde:

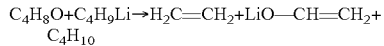

$$C_4H_8O + C_4H_9Li \rightarrow H_2C=CH_2 + LiO-CH=CH_2 + C_4H_{10}$$

However, donor solvents are indispensable for many reactions with RLi compounds, since they can have a positive effect on the reactivity and selectivity. Butyllithium is essentially present in hydrocarbons as a hexameric aggregate. By adding THF, these aggregates are broken and significantly more reactive dimeric and trimeric species are formed.

If such a reaction acceleration by donor solvents is required, the latter are generally used only in situ, i. e. they are only added with the substrate used for the respective reaction. The reaction temperature is chosen so that the desired reaction proceeds much faster than the attack on the donor solvent. Many reactions using organolithium compounds are carried out at low temperatures (often in the temperature range between −100 and 0° C.). It is known that, for example, bromine/lithium exchange reactions take place very quickly in the presence of THF or diethyl ether at −78° C., so that the side reaction—the attack on the solvent—is irrelevant.

Organolithium compounds, mostly n-butyllithium and hexyllithium, are increasingly being used in continuous processes in micro and mesoreactors ("flow processes"). Factors behind this trend are mainly safety considerations, as organolithium compounds are highly reactive and may ignite in air. In addition, savings through process intensification and lower energy consumption are possible, since reactions can often be carried out at higher (non-cryogenic) temperatures than is the case with the classic batch process, due to the drastically improved mixing conditions, the faster heat dissipation and the resultant and controllable, usually shorter residence times. For an overview: see A. Nagaki and J.-I. Yoshida, Top. Organomet. Chem. (2016) 57, 137-76. In general, the standard available organolithium reagents are used as dilute hexane solutions with a concentration of between 1.5 and 2.5 M (M=mol/l; 15-23% by weight in the case of butyllithium) (see US2016/0090361A1).

However, the significantly higher specific surface areas of flow reactors compared to batch reactors and the small diameters of their channel structures also have disadvantages in reactions with butyllithium. Flow reductions and blockages, so-called "reactor fouling", are often observed. These phenomena are attributed to different causes, for example the precipitation of salts in general or specifically lithium hydroxide (S. Laue, V. Haverkamp, L. Mleczko, Org. Proc. Res. Dev. 2016, 20, 480-6). These phenomena mean that flow reactions cannot run stably over a long period of time, so that cleaning cycles have to be interposed again and again. The basic advantages of a continuous reaction are thereby counteracted.

Furthermore, the reaction yields are often lower compared to the batch procedure under analogous reaction conditions.

There is a need for a method which avoids the disadvantages of the prior art, that is, a method that when using organolithium compounds under continuous reaction control (flow reactions)

prevents precipitation of solids and reactor fouling, and
allows for at least equivalent reaction yields compared to the batch procedure.

According to the invention, the object is achieved in that for CC bond formation methods under continuous flow conditions in a micro or mesoreactor system an organic substrate in the presence of a donor solvent is reacted with an organolithium compound to form a Li intermediate, which can be reacted in situ or subsequently in a second reaction step with an electrophile to form an organic secondary product, the organolithium compound RLi being used as a solution in a hydrocarbon or hydrocarbon mixture, and the RLi concentration being at least 3 M, preferably at least 4 M.

The disadvantages of the prior art are overcome by using more concentrated organolithium compounds in a hydrocarbon-based solvent. Preferably an RLi concentration of at least 3 M, particularly preferably at least 4 M, is used. In the case of butyllithium, this corresponds to concentrations of at least 27 or at least 36% by weight, in the case of hexyllithium at least 39 or at least 53% by weight.

The method according to the invention further provides a butyllithium solution in hydrocarbon solvents which is more concentrated than in the established prior art, and the substrate and one or more donor solvents. These donor solvents are selected from the group of ethers, amines, sulfoxides, phosphorus triamides and similarly functionalized substances. All components mentioned are brought together and mixed in a flow micro or mesoreactor. The reactions according to the invention are, for example, addition, deprotonation or halogen/lithium exchange reactions and the resulting lithium intermediate can be reacted with an electrophile in a known manner. Depending on the reaction system, the electrophile can be added as a combination (that is, as a homogeneous mixture) or in parallel or only after the lithium intermediate has formed to the reaction system. The donor solvent can be handled in accordance with method variants A to D (FIG. 1). In method A, the donor solvent is pumped separately into the reactor module; in method B it is mixed in two mixing modules with both the more concentrated RLi solution and with the substrate, in method C it is only added to the substrate, and in method D it is only added to the more concentrated RLi solution.

Reactors for small-scale continuous methods are, depending on their dimensions, i. e. the diameter of their channel structures, referred to as microreactors (channel structures<1 mm) or mesoreactors (channel structures>1 mm up to the cm range). They are available from various suppliers, for example Corning Glass, Vapourtec, Fraunhofer-ICT-IMM or Ehrfeld Mikrotechnik.

The use of more concentrated RLi solutions reduces the amount of added hydrocarbon solvents into the reaction system, i. e. the weight ratio of donor solvent:hydrocarbon is increased. It was surprisingly found that this measure generally reduces the tendency to form solids, i. e. the continuous reaction can be operated for a long period of time without the need to insert a cleaning/rinsing cycle. The weight proportion of hydrocarbon solvents (without taking into account the alkane RH or halide R-Hal (Hal=Cl, Br, or I) optionally formed from the organolithium compound RLi in the reaction) in the reaction mixture after combining all components (i. e. organolithium solution, donor solvent, substrate and optionally electrophile) and before workup, for example by hydrolysis, is at most 11% by weight, particularly preferably at most 8% by weight.

In addition, increased yields are generally observed compared to the batch procedure. Surprisingly, however, no linear effect is observed, but an optimum at a certain RLi concentration. Where this optimum exactly lies is dependent on the particular reaction and the individual substances used. In general, the optimum of the RLi concentration in the case of butyllithium is in the range between about 3 M and 8 M (26 to 75% by weight), particularly preferably between 3.5 and 7 M (32 to 64% by weight).

Substances that can react with organolithium compounds depending on the intended reaction type are used as substrates. In the case of deprotonation, these are preferably CH-acidic compounds, i. e. substances whose acidity is higher than that of aliphatic CH compounds, for example aromatics or heteroaromatics with a directing functional group. For the halogen/lithium exchange reaction, substances containing a halogen ligand, iodide and bromide being preferred, bound to an aromatic or heteroaromatic scaffolding system are preferred. The halogenated aromatics or heteroaromatics can have one or more functional groups, selected from the group consisting of: F, Cl, Br, CN, $CO_2R$, OR, OH, $NR_2$, NHR, $NH_2$, $PR_2$, $P(O)R_2$, $CONR_2$, CONHR, SR, SH, $CF_3$, $NO_2$.

The following compounds from the group of ethers are preferably used as donor solvents: dimethyl ether, diethyl ether, dibutyl ether, cyclopentyl methyl ether, methyl tert-butyl ether, methyl tert-amyl ether; tetrahydropyran, 2-methyltetrahydrofuran, tetrahydropyran; 4-methyltetrahydropyran; 1,2-dimethoxymethane and higher glymes; of amines the following compounds are preferably used: ammonia, trimethylamine, triethylamine, tributylamine, tetramethylethylene diamine (TMEDA), bis(2-dimethylaminoethyl)(methyl)amine (PMDTA), and also hexamethylphosphoramide (RMPA), dimethyl sulfoxide (DMSO), N-methyl-2-pyrrolidone (NMP), dimethylacetamide (DMAC), 1,3-dimethyl-3,4,5,6-tetrahydro-2(1H)pyrimidinone (DMPU).

The more concentrated organolithium reagent is used as a solution in a hydrocarbon solvent. The hydrocarbon solvent preferably contains hexanes, heptanes, octanes, toluene, ethylbenzene, cumene, and/or xylenes.

In the case of deprotonations or halogen/lithium exchange reactions, the lithium intermediate is reacted with an electrophile, the electrophile being selected from carbonyl compounds (aldehydes, ketones, carboxylic esters, carboxamides), nitriles, imines, halogens, halogen compounds, disulfides, water.

BRIEF DESCRIPTION OF DRAWINGS

FIG. 3 schematically illustrates the reaction in the Vapourtec R2/R4 referenced in Example 2 below.

EXAMPLES

The invention is illustrated by the following examples.
General

All reactions were carried out in a flow reactor system (4 pumps R2/R4) from Vapourtec. The chemicals were obtained from Sigma Aldrich without further purification. More concentrated butyllithium solutions were provided by Albemarle.

Example 1

Regioselective Deprotonation of N-methylpyrazole with Butyllithium and Subsequent Reaction with a Boronate Electrophile The reaction according to:

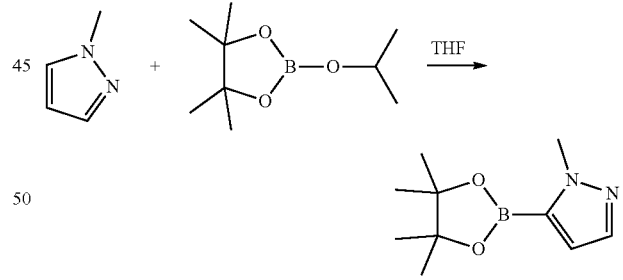

was carried out in batch mode with 1.6 M butyllithium solution in hexane at −5° C. After reaction with isopropoxypinacol borate at −78° C. and warming to room temperature, the borylated species was obtained in a yield of 51% (WO2007/120729A2, p. 62).

Figure 1:
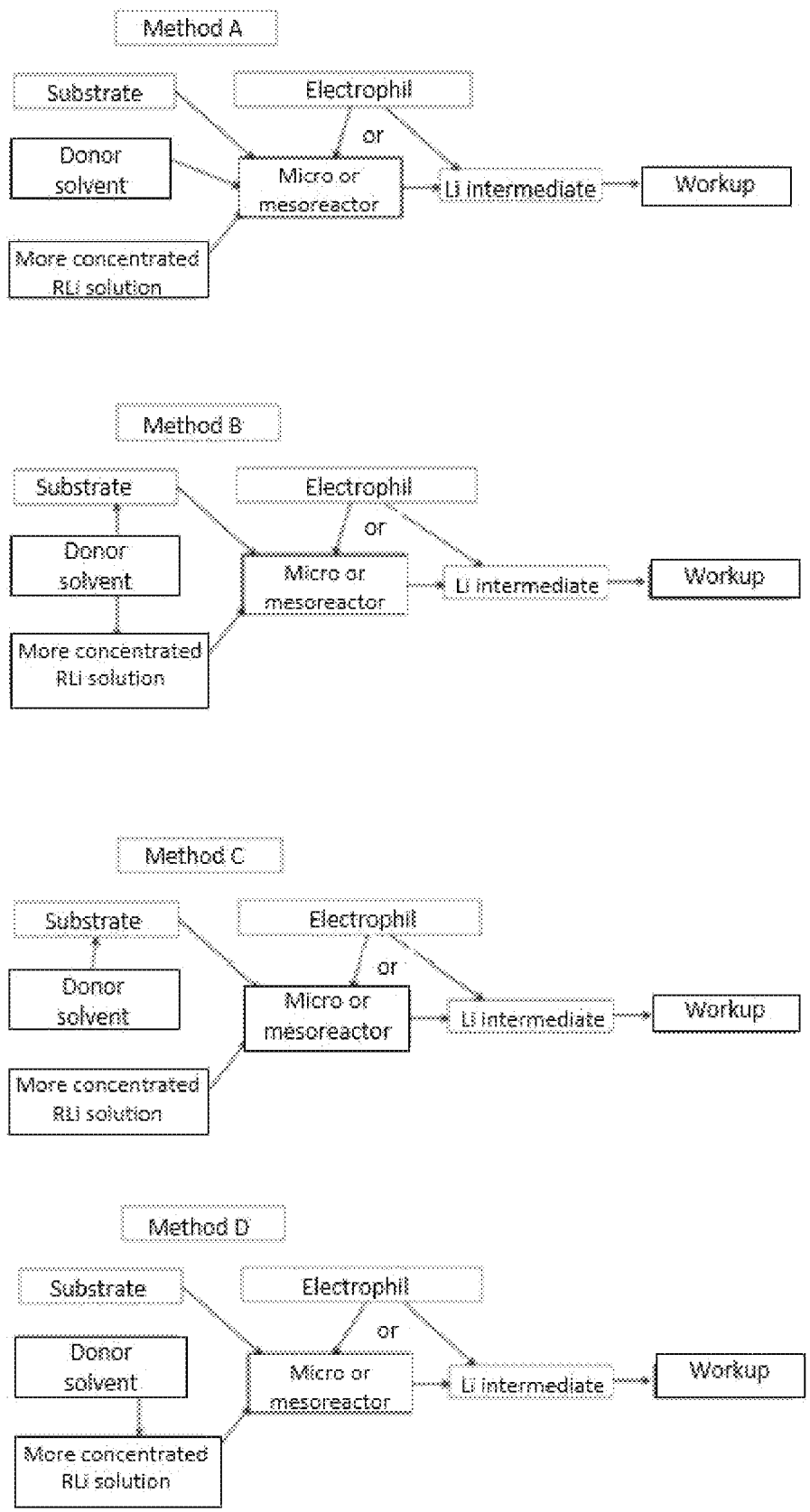
FIG. 1 illustrates variant methods by which the donor solvent can be handled in accordance with one aspect of the invention.
Figure 2:
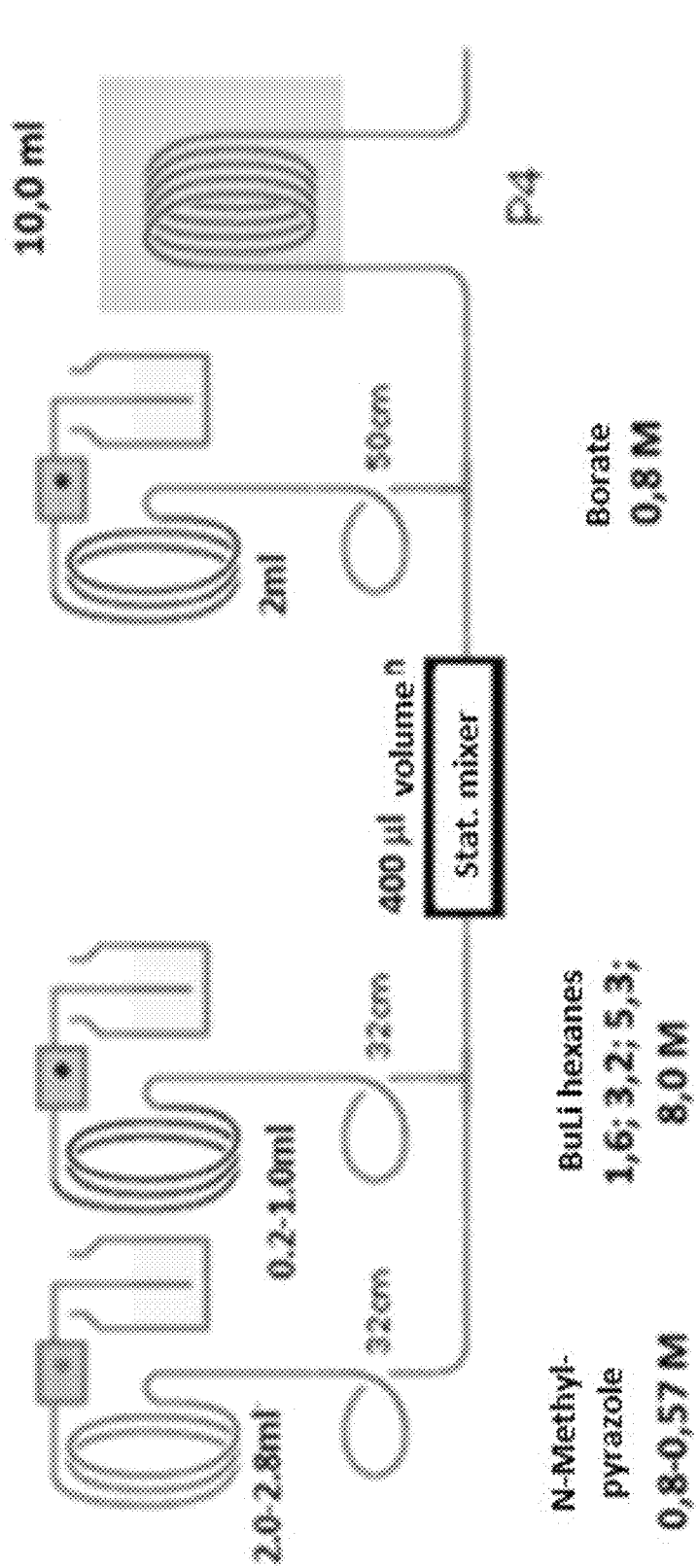
FIG. 2 schematically illustrates the experimental setup of the flow mode reaction referenced in Example 1 below.

The same reaction was investigated in flow mode. The experimental setup is shown in the figure (FIG. 2):

The starting materials butyllithium (BuLi) and the N-methylpyrazole (pyrazole) as a 0.8 M solution in THF were placed in loops and mixed homogeneously by means of pumps in a static mixer with a volume of 400 μl. The isopropoxypinacol borate (boronate) from another loop, also as 0.8 M solution in THF, was added to the other product stream at room temperature. The combined product stream was allowed to react in a residence time module P4 with a volume of 10 ml. The residence time in P4 was approx. 5 minutes.

The reaction solution was quenched with acid, worked up and examined by NMR spectroscopy using an internal standard. The results are set forth in the following table:

| Experiment number | Loop | Starting material | Concentration (mol/l) | Loop size/ ml | Yield (%) | Wt % hexane in reaction mixture |
|---|---|---|---|---|---|---|
| 1* | 1 | Pyrazole | 0.8 | 2 | 29 | 13 |
|  | 3 | Boronate | 0.8 | 2 |  |  |
|  | 2 | BuLi | 1.6 | 1 |  |  |
| 2 | 1 | Pyrazole | 0.64 | 2.5 | 61 | 5.5 |
|  | 3 | Boronate | 0.8 | 2 |  |  |
|  | 2 | BuLi | 3.2 | 0.5 |  |  |
| 3 | 1 | Pyrazole | 0.59 | 2.7 | 66 | 2 |
|  | 3 | Boronate | 0.8 | 2 |  |  |
|  | 2 | BuLi | 5.3 | 0.3 |  |  |
| 4 | 1 | Pyrazole | 0.57 | 2.8 | 51 | 0.6 |
|  | 3 | Boronate | 0.8 | 2 |  |  |
|  | 2 | BuLi | 8 | 0.2 |  |  |

*Comparative example, not according to the invention

When using the 1.6 M (15% by weight) BuLi solution in hexane there is a relatively high hexane proportion of 17% in the reaction mixture. The product yield of 29% is unsatisfactory and is below the comparative value of the batch reaction (51%). When the BuLi concentration is increased to 3.2 and 5.3 M (corresponding to 29 and 49% by weight), very clearly increased yields of 61 and 66%, respectively, are observed. With a further increase of the BuLi concentration to 8 M (73% by weight), a slight drop in the product yield is noted, but it is still on a par with the batch procedure.

When using the 1.6 M BuLi solution, it was observed that the reaction mixture was clearly cloudy before quenching (solids had precipitated), while homogeneous, clear solutions were present when using the more concentrated BuLi solutions.

Example 2

Lithium-Halogen Exchange at 5-Bromopyrimidine with Subsequent Addition to bis(4-chlorophenyl)ketone The lithium-bromine exchange of 5-bromopyrimidine is carried out in a batch procedure at −95° C. Using the 1.6 M solution of butyllithium in hexane, the yield is 34% (H. M. Taylor, C. D. Jones, J. D. Davenport, K. S. Hirsch, T. J. Kress, D. Weaver, J. Med. Chem. 1987, 30, 1359-65, see Table I, ex. 1).

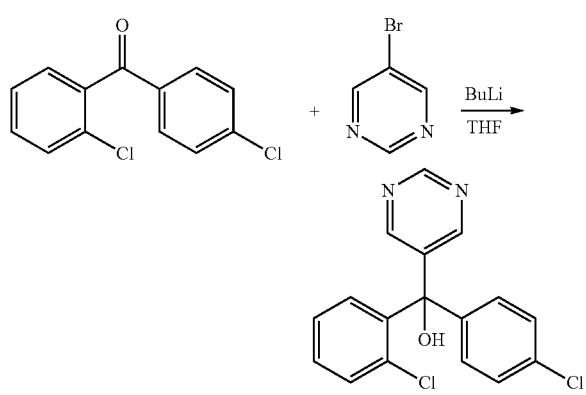

The reaction in the Vapourtec R2/R4 (FIG. 3) was carried out as follows: three addition loops, each with a volume of 2 ml, were filled with the starting materials. All components were used as THF-containing solutions (for details, see table below). BuLi solutions with different concentrations were diluted with THF to the desired volume of 2 ml before filling into the loop. All starting materials were used in a molar ratio of 1:1:1.

The two substrate streams of the ketone and the bromide were combined using a T-piece and mixed and then the BuLi solution was added. The combined streams were pumped into a static mixer and mixed there vigorously. The mixture was then transferred to a residence time module P4, in which the actual reaction took place. Both the static mixer as well as the residence time module were cooled to −78° C. by means of a dry ice/acetone bath. The product stream flowing from the residence time module was quenched with a saturated ammonium chloride solution. Aliquots were checked for reaction completion using HPLC analysis.

The reaction results are set forth in the following table:

| Experiment number | Loop | Starting material | Concentration (mol/l) | Loop volume (ml) | Yield (%) | Wt % hexane in reaction. mixture |
|---|---|---|---|---|---|---|
| 1* | 1 | Ketone | 1.6 | 2 | 22 |  |
|  | 2 | Bromide | 1.6 | 2 |  | 23 |
|  | 3 | BuLi | 1.6 | 2 |  |  |
| 2 | 1 | Ketone | 1.6 | 2 | 34 |  |
|  | 2 | Bromide | 1.6 | 2 |  | 9 |
|  | 3 | BuLi | 3.2** | 2 |  |  |
| 3 | 1 | Ketone | 1.6 | 2 | 42 |  |
|  | 2 | Bromide | 1.6 | 2 |  | 4 |
|  | 3 | BuLi | 5.3** | 2 |  |  |
| 4 | 1 | Ketone | 1.6 | 2 | 31 |  |
|  | 2 | bromide | 1.6 | 2 |  | 1 |
|  | 3 | BuLi | 8** | 2 |  |  |

*Comparative experiment, not according to the invention;
**BuLi/hexane concentration used, diluted to a volume of 2 ml with THF When using the dilute 1.6 molar BuLi solution a very low product yield of 22% is observed. With an increase in the BuLi concentration or a decrease in the proportion of hexane in the reaction mixture, the yield increases significantly and, when using the 5.3 molar (49% by weight) solution, it is at 42% significantly higher than the result of the batch reaction (34%).

The invention claimed is:
1. A method for CC bond formation under continuous flow conditions in a microreactor or mesoreactor system, characterized by:
reacting an organic substrate in the system with an organolithium compound in the presence of a donor solvent to form a Li intermediate, and
reacting the Li intermediate in situ or subsequently in a second reaction step in the system with an electrophile to form an organic secondary product, the organolithium compound being used as a solution in a hydrocarbon or hydrocarbon mixture, and the organolithium compound concentration of the solution being in the range of 3.2 M to 8 M.
2. The method according to claim 1, characterized in that the organolithium compound is represented by the formula RLi where R=alkyl group having 2-12 C atoms.
3. The method according to claim 1, characterized in that either butyllithium or hexyllithium is used as the organolithium compound and that, when butyllithium is used, the butyllithium concentration is at least 27% by weight of the solution, and when hexyllithium is used, the hexyllithium concentration is at least 39% by weight of the solution.

4. The method according to claim 3, characterized in that the butyllithium concentration is at least 36% by weight of the solution, and the hexyllithium concentration is at least 53% by weight of the solution.

5. The method according to claim 1, characterized in that the organolithium compound concentration of the solution is in the range of 3.5 M 7 M.

6. The method according to claim 5, characterized in that the hydrocarbon solvent comprises hexanes, heptanes, octanes, toluene, ethylbenzene, cumene, and/or xylenes.

7. The method according to claim 6, characterized in that the donor solvent is selected from the group of ethers, amines, sulfoxides, and phosphorus triamides.

8. The method according to claim 7, characterized in that dimethyl ether, diethyl ether, dibutyl ether, cyclopentyl methyl ether, methyl tert-butyl ether, methyl tert-amyl ether, tetrahydrofuran, 2-methyltetrahydrofuran, tetrahydropyran, 4-methyltetrahydropyran, 1,2-dimethoxymethane and higher glymes; ammonia, trimethylamine, triethylamine, tributylamine, tetramethylethylene diamine, bis(2-dimethyl-aminoethyl)(methyl)amine, hexamethylphosphoramide, dimethyl sulfoxide, N-methyl-2-pyrrolidone, dimethylacet-amide, 1,3-dimethyl-3,4,5,6-tetrahydro-2(1H)-pyrimidinone or any mixture of any two or more of the foregoing is used as the donor solvent.

9. The method according to claim 8, characterized in that the weight proportion of hydrocarbon solvent, without taking into account the alkane RH or halide R-Hal (Hal=Cl, Br, or I) optionally formed from the organolithium compound in the reaction in the reaction mixture, after combining the solution, the donor solvent, the substrate, and the electrophile components and before workup is at most 11% by weight.

10. The method according to claim 9, characterized in that the weight proportion of hydrocarbon solvent is a maximum of 8% by weight.

11. The method according to claim 10, characterized in that carbonyl compounds selected from the group consisting of aldehydes, ketones, carboxylic acid esters, carboxamides or nitriles, imines, halogens, halogen compounds, disulfides, and water are used as the electrophile.

12. The method according to claim 1 characterized in that the hydrocarbon solvent comprises hexanes, heptanes, octanes, toluene, ethylbenzene, cumene, and/or xylenes.

13. The method according to claim 1, characterized in that the donor solvent is selected from the group of ethers, amines, sulfoxides, phosphorus triamides.

14. The method according to claim 13, characterized in that dimethyl ether, diethyl ether, dibutyl ether, cyclopentyl methyl ether, methyl tert-butyl ether, methyl tert-amyl ether, tetrahydrofuran, 2-methyltetrahydrofuran, tetrahydropyran, 4-methyltetrahydropyran, 1,2-dimethoxymethane and higher glymes; ammonia, trimethylamine, triethylamine, tributylamine, tetramethylethylene diamine, bis(2-dimethyl-aminoethyl)(methyl)amine, hexamethylphosphoramide, dimethyl sulfoxide, N-methyl-2-pyrrolidone, dimethylacet-amide, 1,3-dimethyl-3,4,5,6-tetrahydro-2(1H)-pyrimidinone or any mixture of any two or more of the foregoing is used as the donor solvent.

15. The method according to claim 1, characterized in that the weight proportion of hydrocarbon solvent, without taking into account the alkane RH or halide R-Hal (Hal=Cl, Br, or I) optionally formed from the organolithium compound in the reaction in the reaction mixture, after combining the solution, the donor solvent, the substrate, and the electrophile components and before workup is at most 11% by weight.

16. The method according to claim 15, characterized in that the weight proportion of hydrocarbon solvent is a maximum of 8% by weight.

17. The method according to claim 16, characterized in that carbonyl compounds selected from the group consisting of aldehydes, ketones, carboxylic acid esters, carboxamides or nitriles, imines, halogens, halogen compounds, disulfides, and water are used as the electrophile.

18. The method according to claim 1, characterized in that carbonyl compounds selected from the group consisting of aldehydes, ketones, carboxylic acid esters, carboxamides or nitriles, imines, halogens, halogen compounds, disulfides, and water are used as the electrophile.

\* \* \* \* \*

UNITED STATES PATENT AND TRADEMARK OFFICE
CERTIFICATE OF CORRECTION

Page 1 of 1

PATENT NO. : 11,407,769 B2
APPLICATION NO. : 16/763775
DATED : August 9, 2022
INVENTOR(S) : Stefan Schnippering et al.

It is certified that error appears in the above-identified patent and that said Letters Patent is hereby corrected as shown below:

On the Title Page

Item (30) "Foreign Application Priority Data", the priority date reads "Feb. 14, 2018" and should read -- November 14, 2017 --.

Signed and Sealed this
Twenty-eighth Day of February, 2023

Katherine Kelly Vidal
*Director of the United States Patent and Trademark Office*